(12) United States Patent
Kendall

(10) Patent No.: US 7,883,279 B2
(45) Date of Patent: Feb. 8, 2011

(54) CAMERA ADAPTER SUPPORT

(76) Inventor: Charles S. Kendall, 2792 Dylan Schar Ct., Oak Hill, VA (US) 20171

( * ) Notice: Subject to any disclaimer, the term of this patent is extended or adjusted under 35 U.S.C. 154(b) by 98 days.

(21) Appl. No.: 12/318,079

(22) Filed: Dec. 22, 2008

(65) Prior Publication Data

US 2010/0158499 A1 Jun. 24, 2010

(51) Int. Cl.
G03B 41/00 (2006.01)
(52) U.S. Cl. ....................... 396/428; 348/722
(58) Field of Classification Search .................. 352/48, 352/53, 85, 88, 243; 348/722; 248/202.1, 248/675; 396/419, 428
See application file for complete search history.

(56) References Cited

U.S. PATENT DOCUMENTS

| 755,649 | A | | 3/1904 | Geier |
| 812,233 | A | | 2/1906 | Rock |
| D131,341 | S | | 2/1942 | Benson et al. |
| 2,364,363 | A | * | 12/1944 | Howell .................... 248/179.1 |
| 3,064,547 | A | * | 11/1962 | Humphries ................. 396/428 |
| 3,286,212 | A | | 11/1966 | Thompson et al. |
| 3,592,429 | A | | 7/1971 | Miller |
| 4,319,825 | A | | 3/1982 | Newton |
| 4,457,610 | A | | 7/1984 | Kawazoe |
| 5,098,182 | A | * | 3/1992 | Brown ......................... 352/243 |
| 5,742,859 | A | * | 4/1998 | Acker ......................... 396/419 |
| 5,752,113 | A | | 5/1998 | Borden |
| 5,768,648 | A | | 6/1998 | Skipp et al. |
| 5,870,642 | A | | 2/1999 | Mittelstaedt et al. |
| 5,963,749 | A | | 10/1999 | Nicholson |
| 6,019,326 | A | | 2/2000 | Baerwolf et al. |
| 6,027,085 | A | | 2/2000 | Ruther |
| 6,149,112 | A | * | 11/2000 | Thieltges ................. 248/178.1 |
| 6,354,544 | B1 | | 3/2002 | Muzila |
| 6,354,750 | B1 | * | 3/2002 | Romanoff ................... 396/428 |
| 6,697,118 | B2 | * | 2/2004 | Zadok ......................... 348/375 |
| 6,991,384 | B1 | | 1/2006 | Davis |
| 7,085,491 | B2 | | 8/2006 | Chiang |
| 7,178,997 | B2 | | 2/2007 | Claudi et al. |
| 7,287,731 | B2 | | 10/2007 | Johnson |
| 2003/0128975 | A1 | * | 7/2003 | Shevick ...................... 396/428 |
| 2005/0098692 | A1 | * | 5/2005 | Yang ........................ 248/163.1 |
| 2006/0110155 | A1 | | 5/2006 | Kouchi et al. |
| 2007/0122141 | A1 | * | 5/2007 | Agevik et al. ............... 396/419 |

* cited by examiner

*Primary Examiner*—Clayton E LaBalle
*Assistant Examiner*—Leon W Rhodes
(74) *Attorney, Agent, or Firm*—Welsh Flaxman & Gitler LLC

(57) ABSTRACT

A camera adapter support for supporting a camera in an orientation transverse to its traditional orientation includes a base member shaped and dimensioned for selective attachment to a head of a tripod. The base member includes a first end and a second end. A first upstanding member is secured to the first end of the base member. The first upstanding member includes a first end secured to the first end of the base member and a second end. The first upstanding member includes coupling structure which secures the base of the camera to the first upstanding member. A second upstanding member is secured to the second end of the base member, the second upstanding member including a first end secured to the first end of the base member for selective movement relative thereto and a second end. The second upstanding member includes a plate member and a second transverse plate coupled to the plate member. The second transverse plate is shaped and dimensioned for supporting a portion of the camera as it lies across the base member.

18 Claims, 6 Drawing Sheets

CAMERA ADAPTER SUPPORT

BACKGROUND OF THE INVENTION

1. Field of the Invention

The invention relates to a camera support. More particularly, the invention relaters to a camera adapter support for securing a camera to a tripod in an orientation transverse to the camera's traditional supported orientation.

2. Description of the Related Art

Amateur and professional cameramen often have the need to rotate their cameras from a conventional horizontal orientation to a vertical orientation. This need has become even more profound as wide screen LCD displays are utilized in a variety of orientation promotional environments for presenting commercials either in malls, storefronts or on street displays. It has now become highly desirable that these LCD displays be oriented such that the long dimension extends vertically while the short dimension extends horizontally. This provides an aesthetically desirable image for those wishing to create a commercial display.

However, in order to optimally film video for use with such displays, it is necessary for cameramen to reorient their cameras. To date, no adapter support has been designed for this purpose. As such, the present invention provides a camera adapter support for use with a variety of different cameras for supporting the camera in a vertical orientation to allow for filming in either a horizontal or a vertical orientation.

SUMMARY OF THE INVENTION

It is, therefore, an object of the present invention to provide a camera adapter support for supporting a camera in an orientation transverse to its traditional orientation. The camera adapter support includes a base member shaped and dimensioned for selective attachment to a head of a tripod. The base member includes a first end and a second end. A first upstanding member is secured to the first end of the base member. The first upstanding member includes a first end secured to the first end of the base member and a second end. The first upstanding member includes coupling structure which secures the base of the camera to the first upstanding member. A second upstanding member is secured to the second end of the base member, the second upstanding member including a first end secured to the first end of the base member for selective movement relative thereto and a second end. The second upstanding member includes a plate member and a second transverse plate coupled to the plate member. The second transverse plate is shaped and dimensioned for supporting a portion of the camera as it lies across the base member.

It is also an object of the present invention to provide a camera adapter support wherein the first upstanding member is fixedly secured to the base member.

It is another object of the present invention to provide a camera adapter support wherein the first upstanding member is substantially flat.

It is a further object of the present invention to provide a camera adapter support wherein the first upstanding member is oriented approximately perpendicular to the base member.

It is also an object of the present invention to provide a camera adapter support wherein the first upstanding member is pivotally secured to the base member.

It is another object of the present invention to provide a camera adapter support wherein the second upstanding member includes a plate member coupled to a first transverse plate and the plate member is pivotally coupled to the first transverse plate.

It is a further object of the present invention to provide a camera adapter support wherein the second upstanding member includes the plate member coupled to a first transverse plate.

It is also an object of the present invention to provide a camera adapter support wherein the first transverse plate is shaped and dimensioned for engaging the base member and supporting the second upstanding member as it sits upon the base member.

It is another object of the present invention to provide a camera adapter support wherein the plate member is fixedly coupled to the first transverse plate.

It is a further object of the present invention to provide a camera adapter support wherein the plate member is oriented substantially perpendicular to the base member.

It is also an object of the present invention to provide a camera adapter support wherein the plate member is pivotally coupled to the first transverse plate.

It is another object of the present invention to provide a camera adapter support wherein the coupling structure of the first upstanding member includes a plurality of apertures formed therein for receiving coupling members which secure the base of the camera to the first upstanding member.

It is a further object of the present invention to provide a camera adapter support wherein the second transverse plate may be selectively moved relative to the plate member.

It is also an object of the present invention to provide a camera adapter support wherein the second transverse plate includes a locking screw.

It is another object of the present invention to provide a camera adapter support wherein the second upstanding member may be selectively moved relative to the base member.

It is a further object of the present invention to provide a camera adapter support wherein the second upstanding member may be longitudinally moved relative to the base member.

It is also an object of the present invention to provide a camera adapter support wherein the plate member of the second upstanding member may be pivotally moved relative to the base member.

It is another object of the present invention to provide a camera adapter support wherein the base'member includes a plurality of apertures for attachment of the camera support to a head of a tripod.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

Figure 1:
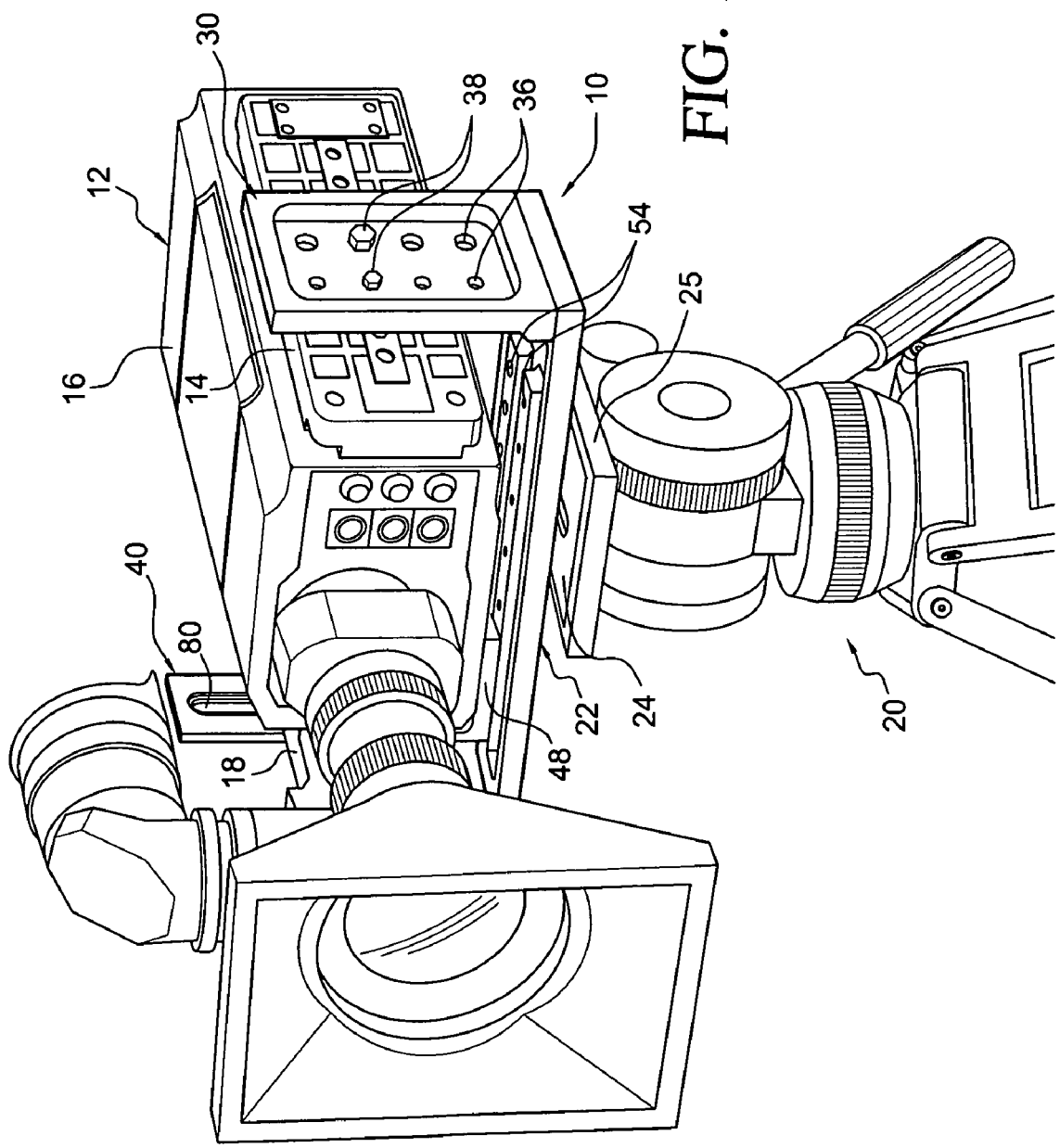
FIG. 1 is a perspective view of a preferred embodiment of the present camera support with a camera secured thereto in accordance with the present invention.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

In accordance with a preferred embodiment of the present invention, and with reference to FIGS. 1 to 6, a camera adapter support 10 is disclosed. The camera adapter support 10 is designed for supporting a camera 12 in an orientation transverse to its traditional orientation, that is, with long lens dimension extends vertically while the short lens dimension extends horizontally as opposed to a conventional orientation with the short lens dimension extending vertically while the long lens dimension extends horizontally. With this in mind, a traditional camera includes a base 14 with a camera body 16 extending upwardly therefrom and a handle 18 secured at the upper surface of the body 16. As such, the camera 12 is designed such that it may be generally supported in a vertical orientation with the bottom of the camera base 14 sitting directly upon a tripod 20 and the handle 18 extending upwardly therefrom. However, it is desirable at times to transversely orient the camera 12 for the creation of images where the long axis of the lens is vertically oriented and the short axis of the lens is horizontally oriented. The present camera adapter support 10 allows for reorientation of a camera 12 and attachment of the reoriented camera 12 on a tripod 20 in such an orientation.

Briefly, the camera adapter support 10 includes a base member 22 shaped and dimensioned for selective attachment to a wedge plate 24 which is ultimately secured to the head 25 of a tripod 20. The base member 22 includes a first end 26 and a second end 28. A first upstanding member 30 is secured to the first end 26 of the base member 22. The first upstanding member 30 includes a first end 32 fixedly secured to the first end 26 of the base member 22 and a second end 34 freely extending upwardly from the base member 22. The first upstanding member 30 is substantially flat and is oriented approximately perpendicular to the base member 22. The first upstanding member 30 includes a plurality of apertures 36 formed therein for receiving coupling members 38 which secure the base 14 of the camera 12 to the first upstanding member 30.

A second upstanding member 40 is secured to the second end 28 of the base member 22. The second upstanding member 40 includes a first end 42 secured to the second end 28 of the base member 22 for selective movement relative thereto and a second end 44 extending freely upwardly from the base member 22. The second upstanding member 40 includes a plate member 46 oriented substantially perpendicular to the base member 22. The second upstanding member 40 also includes a first transverse plate 48 fixedly coupled to a first end 42 of the plate member 46 and a second transverse plate 50 coupled to the plate member 46 at a central position along the plate member 46. The first transverse plate 48 is shaped and dimensioned for engaging the base member 22 and supporting the remainder of the second upstanding member 40 as it sits substantially perpendicular relative to the base member 22. The second transverse plate 50 is shaped and dimensioned for supporting a portion of the camera 12 for example, the handle 18, as it lies across the base member 22.

More particularly, the base member 22 is composed of a substantially flat plate 52 having a plurality of apertures 54 formed therein. The apertures 54 are positioned such that bolts 56 may be passed therethrough for securing the base member 22 directly to a wedge plate 24 which is then secured the head 25 of a tripod 20 using a conventional wedge engagement assembly 27. While a conventional wedge plate and wedge engagement assembly are employed in accordance with a preferred embodiment for securing the present camera adapter support to a tripod, it is contemplated other coupling structures may be employed. The base member 22 is provided with a plurality of apertures 54 such that the base member 22 may be utilized with various wedge plates 24 and tripod heads 25 and may be secured to the wedge plate 24 (and ultimately the tripod head 25) at various locations along the base member 22.

As briefly discussed above, a first upstanding member 30 is secured to the first end 26 of the base member 22. The first upstanding member 30 is preferably bolted directly to the first end 26 of the base member 22 such that it stands substantially perpendicular to the base member 22. With this in mind, the first upstanding member 30 is also substantially flat and lies in a plane which is perpendicular to a plane in which the base member 22 lies.

As discussed above, the first upstanding member 30 includes a plurality of apertures 36 formed therein for receiving coupling members 38 which secure the base 14 of the camera 12 to the first upstanding member 30. With this in mind, the apertures 36 are formed at various locations to accommodate different brands and styles of cameras. In addition, the apertures 36 are elongated so as to allow for additional play in the attachment and passage of coupling member 38 therethrough for attachment of a base 14 thereto.

In addition to the base member 22 and first upstanding member 30, a second upstanding member 40 is secured at the second end 28 of the base member 22. The second upstanding member 40 is secured to the second end 28 of the base member 22 such that the second upstanding member 40 may be adjusted along the long axis of the base member 22 for accommodating cameras of different heights. The coupling structure 58 for permitting selective attachment of the second upstanding member 40 to the base member 22 includes a recessed, centrally formed track 60 along the upper surface 62 of the base member 22 which receives a guide protrusion 64 extending downwardly from the first transverse plate 48 of the second upstanding member 40. As such, the guide protrusion 64 extending downwardly from the first transverse plate 48 sits within the track 60 formed in the upper surface 62 of the base member 22 such that the second upstanding member 40 may be moved in a controlled manner along the length of the base member 22.

Selective coupling of the second upstanding member 40 to the base member 22 is achieved through the provision of a locking mechanism 66 that applies frictional pressure sandwiching the first transverse plate 48 and the base member 22 such that they may not be freely moved relative to each other. The locking mechanism 66 includes a locking knob 68 and bolt 70. The bolt 70 extends through apertures 72, 74 formed in the first transverse plate 48 and the track 60 of the base member 22. As such, the second upstanding member 40 and base member 22 may be freely moved relative to each other along the track 60 and when one desires to lock the second upstanding member 40 and base member 22 in their relative positions the locking knob 68 is tightened on the bolt 70 creating friction between the first transverse plate 48 and the base member 22 locking the entire configuration in place. Although a preferred lock mechanism is disclosed above, it is contemplated other lock structures may be employed without departing from the spirit of the present invention, for example, a bolt with a hex head used for locking the assembly in a desired orientation.

As also discussed above, a second transverse plate 50 is coupled to the plate member 46 of the second upstanding member 40 for supporting the handle 18 of a camera 12. The second transverse plate 50 includes a first arm 76 and a second arm 78 which are oriented substantially perpendicular to each other. The first arm 76 is ultimately oriented substantially parallel to the base member 22 while the second arm 78 is oriented perpendicular to the base member 22 and parallel to the plate member 46 of the second upstanding member 40. The second arm 78 is coupled to the plate member 46 such that the second transverse plate 50 may be moved along the length of the plate member 46 so as to accommodate cameras 12 requiring support at different heights. Controlled movement of the second transverse plate 50 relative to the plate member 46 is achieved by providing a guide channel 80 in the plate member 46 along an axis aligned with the long axis of the plate member 46. The second arm 78 is provided with a guide protrusion 82 that fits within the guide channel 80 of the plate member 46 and is, therefore, freely guided therein. Locking of the second transverse plate 50 relative to the plate member 46 is achieved through the provision of a frictional locking mechanism 84 that extends through an aperture 81 in the center of the guide channel 80 and into the second arm 78 of the second transverse plate 50 where it is fixedly secured. As such, when one desires to tighten the second transverse plate 50 in a desired orientation relative to the plate member 46, the locking knob 86 is rotated upon a bolt 87 of the frictional locking mechanism 84 to tighten the second arm 78 into frictional engagement with the plate member 46 thereby locking it in position.

Figure 2:
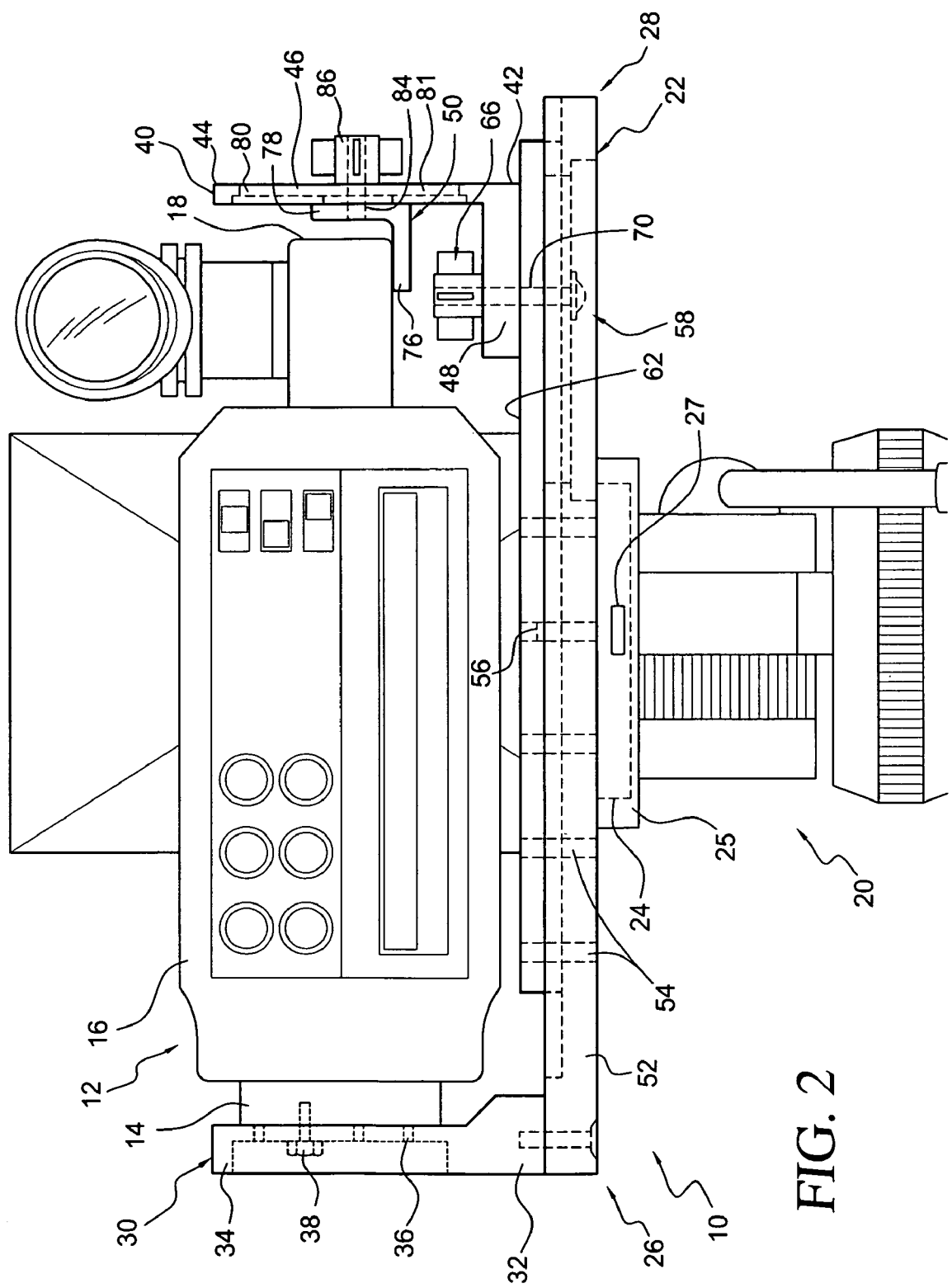
FIG. 2 is a side plan view showing the camera mounted within the camera support disclosed with reference to FIG. 1.
Figure 3:
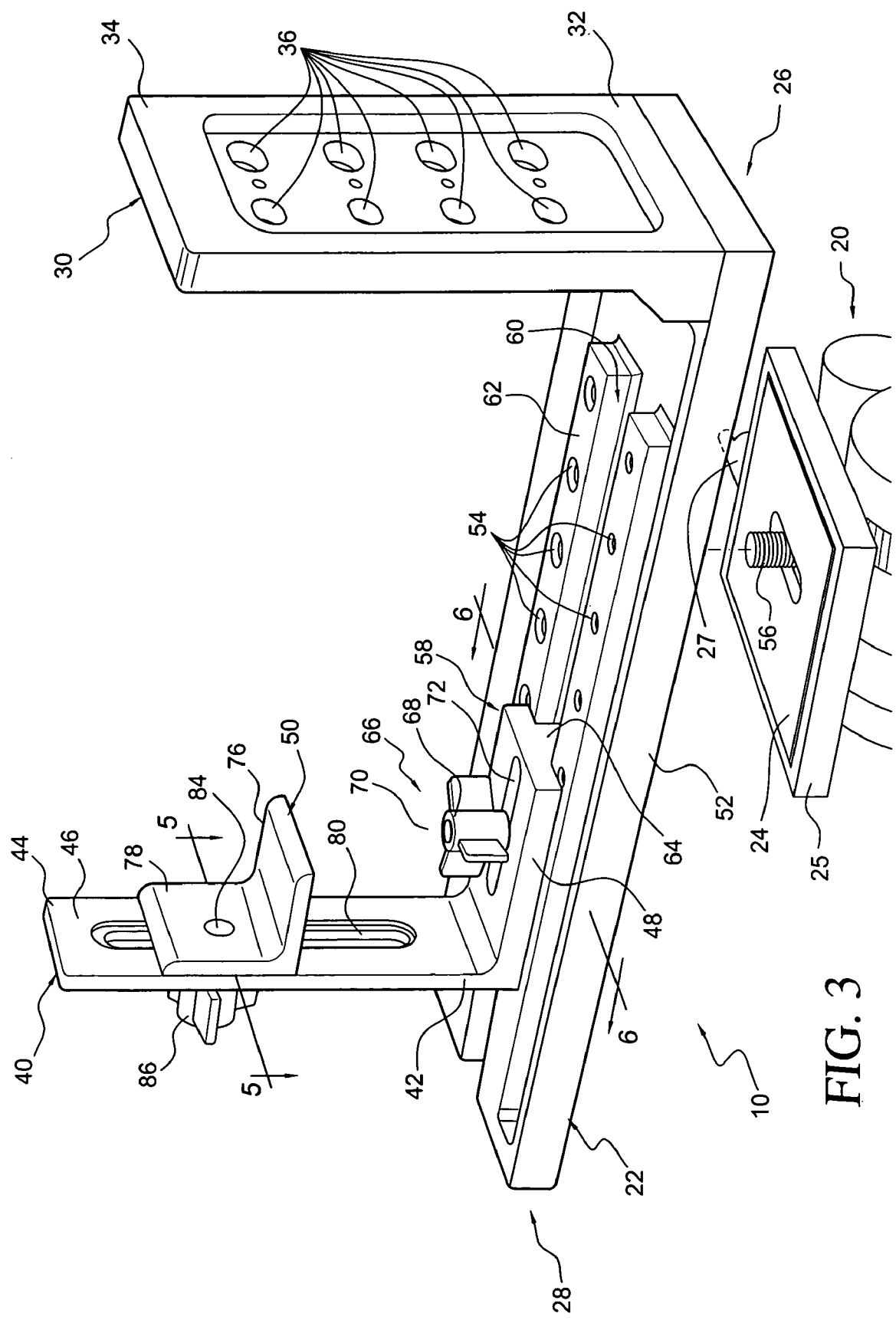
FIG. 3 is a perspective view of the camera support shown with reference to FIG. 1.
Figure 4:
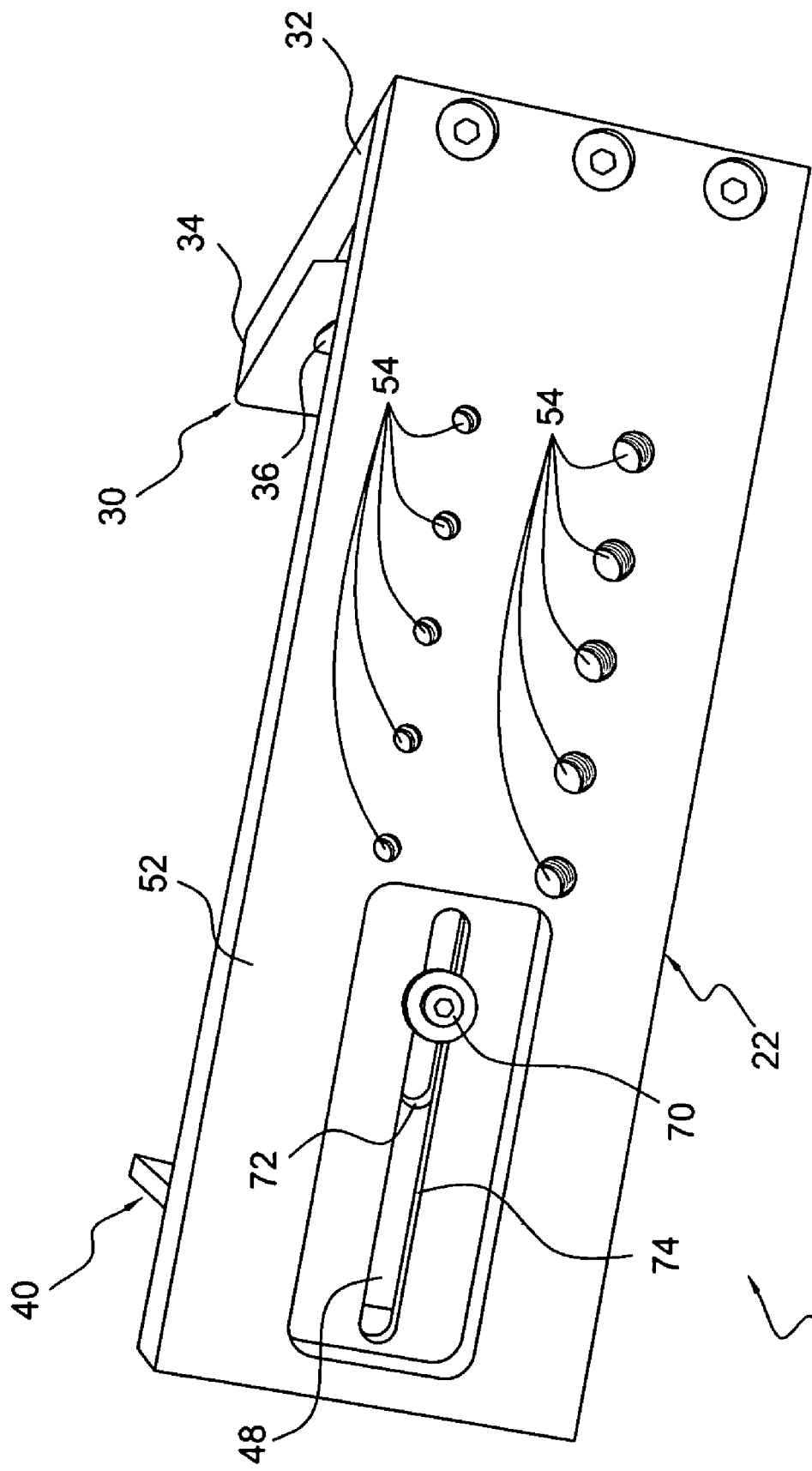
FIG. 4 is a bottom perspective of the camera support shown with reference to FIG. 1.
Figure 6:
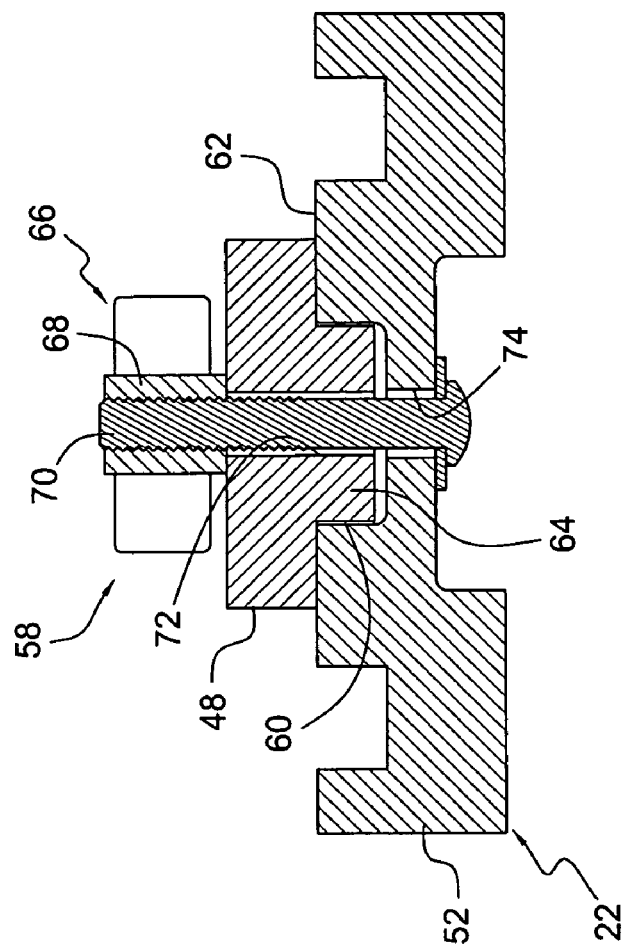
FIG. 6 is a cross-sectional view along the line 6-6 in FIG. 3.
Figure 5:
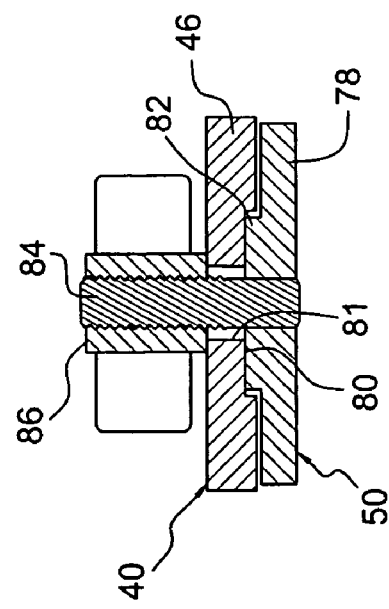
FIG. 5 is a cross-sectional view along the line 5-5 in FIG. 3.

In addition to the usage described above, it is further contemplated the locking knob 68 of the locking mechanism 66 may be loosened enough so that the second upstanding member 40, in particular, the plate member 46, can turned 180 degrees and face the direction opposite the direction shown in FIGS. 1, 2 and 3. The second transverse plate 50 may then be removed completely from the plate member 46 by detaching the locking knob 86 of the frictional locking mechanism 84. The second transverse plate 50 is then secured on the opposite side of the plate member 46 by reattaching the locking knob 86 and securing the frictional locking mechanism 84. Such an adjustment would be made when one is working with smaller cameras and you need the second upstanding member 40 to traverse closer to the first upstanding member 30 so that it can actually support the top of the camera.

Figure 7:
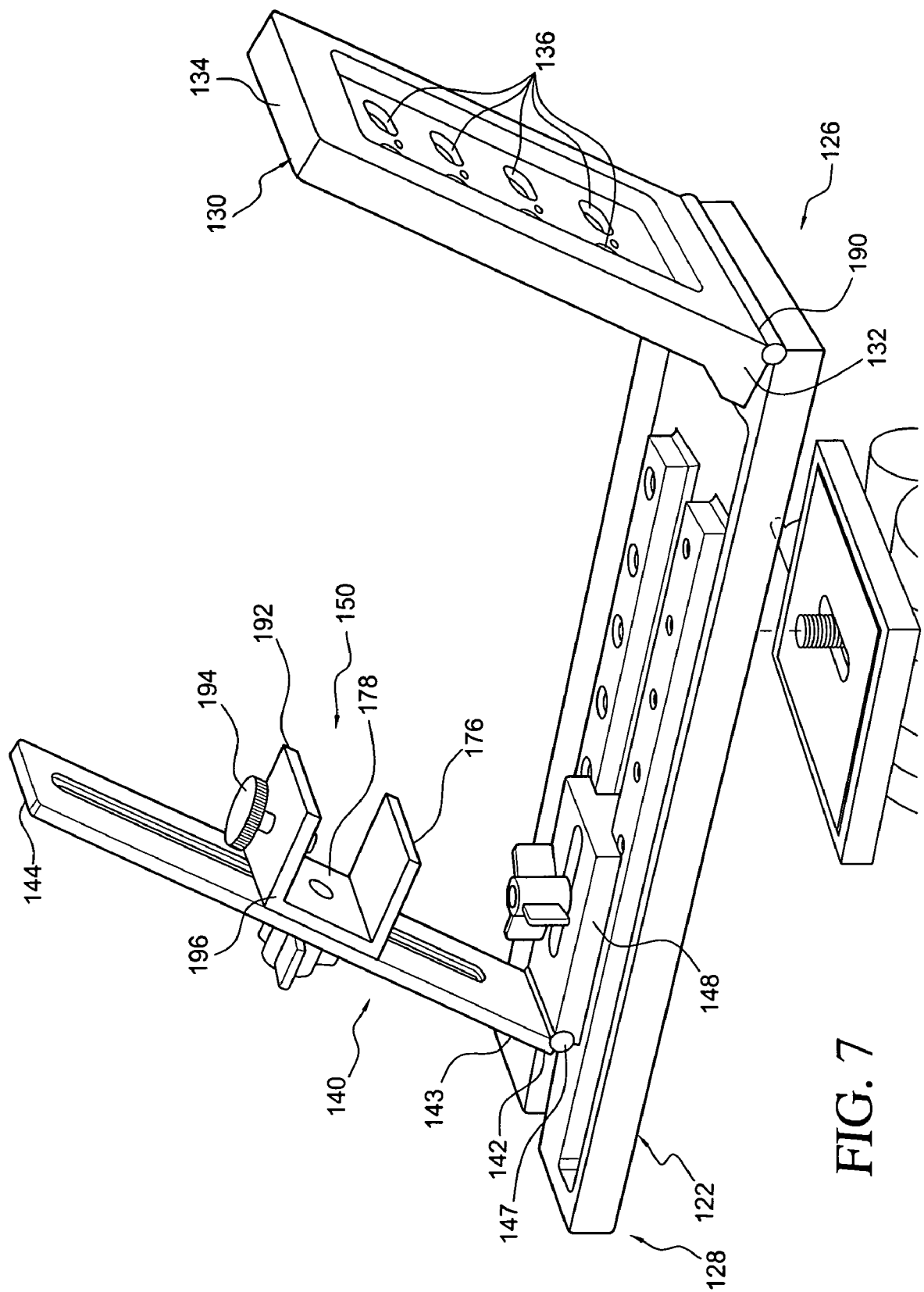
FIG. 7 is a perspective view of a camera support in accordance with an alternate embodiment of the present invention.

Although a fixedly mounted first upstanding member 30 and a fixedly mounted plate member 46 (that is, relative to the first transverse plate 48) are disclosed above, it is contemplated the first upstanding member and the plate member could be pivotally mounted so as to provide for greater versatility in the use of the present support. In particular, and with reference to FIG. 7, the base member 122 includes a first end 126 and a second end 128. The first upstanding member 130 is pivotally secured to the first end 126 of the base member 122 via a hinge 190 secured therebetween. The first upstanding member 130 includes a first end 132 pivotally secured to the first end 126 of the base member 122 via the hinge 190 and a second end 134 freely extending upwardly from the base member 122. The first upstanding member 130 is substantially flat and is oriented for pivotal rotation relative to the base member 122. As with the prior embodiment as discussed herein with reference to FIGS. 1 to 6, the first upstanding member 130 includes a plurality of apertures 136 formed therein for receiving coupling members which secure the base of the camera to the first upstanding member 130.

The second upstanding member 140 is secured to the second end 128 of the base member 122 for controlled pivotal and longitudinal movement. The second upstanding member 140 includes a first end 142 secured to the second end 128 of the base member 122 for selective movement relative thereto and a second end 144 extending freely upwardly from the base member 122. The second upstanding member 140 includes a plate member 146 having a first end 143 pivotally secured to a first transverse plate 148 via a hinge 147. As a result, the plate member 146 is mounted for pivotal motion relative to the base member 122.

As with the prior embodiment, the second upstanding member 140 also includes a second transverse plate 150 coupled to the plate member 146 at a central position along the plate member 146 for controlled movement relative thereto in the manner discussed above with regard to the prior embodiment. However, and in contrast to the prior embodiment, the transverse plate 150 is provided with an opposed securing third arm 192 in addition to the first arm 176 and the second arm 178. The third arm 192 lies in a plane oriented substantially parallel to the plane in which the first arm 176 lies and extends from an end of the second arm 178 opposite the end of the second arm 178 from which first arm 176 extends. The first, second and third arms 176, 178, 192 are oriented to defined a substantially C-shaped bracket 196 shaped and dimensioned for supporting and engaging the handle of a camera. Secure mounting is further enhanced by providing the third arm 192 with a locking screw 194 shaped and dimensioned for movement toward and away from the first arm 176 for applying pressure to articles, for example, a camera handle, positioned within the cavity defined by the C-shaped bracket 196. As those skilled in the art will certainly appreciate, a locking screw 194 relies upon threading between itself and an aperture in the third arm 192 to allow for controlled movement thereof.

The remaining structure for this hinged embodiment is substantially the same as disclosed above with regard to the embodiment disclosed with reference to FIGS. 1 to 6 and will not be repeated herein.

In practice, the camera is secured between the plate member 146 and the first upstanding member 130 as discussed above, the only exception being the use of the locking screw 194 to further enhance secure mounting of the camera. Once the camera is secured between the plate member 146 and the first upstanding member 130, the created four bar linkage holds the camera in a secure position despite the hinges discussed above.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A camera adapter support for supporting a camera in an orientation transverse to its traditional orientation, comprising:
   a base member shaped and dimensioned for selective attachment to a head of a tripod, the base member including a first end and a second end;
   a first upstanding member secured to the first end of the base member, the first upstanding member including a first end secured to the first end of the base member and a second end, the first upstanding member including coupling structure which secures a base of a camera to the first upstanding member;

a second upstanding member secured to the second end of the base member, the second upstanding member including a first end secured to the second end of the base member for selective movement relative thereto and a second end, wherein the second upstanding member includes a plate member and a second transverse plate coupled to the plate member, the second transverse plate being shaped and dimensioned for supporting a portion of a camera as it lies across the base member; the second transverse plate being coupled to the plate member for selective movement along the length of the plate member so as to accommodate cameras requiring support at different heights.

2. The camera adapter support according to claim 1, wherein the first upstanding member is fixedly secured to the base member.

3. The camera adapter support according to claim 2, wherein the first upstanding member is substantially flat.

4. The camera adapter support according to claim 2, wherein the first upstanding member is oriented approximately perpendicular to the base member.

5. The camera adapter support according to claim 1, wherein the first upstanding member is pivotally secured to the base member.

6. The camera adapter support according to claim 5, wherein the second upstanding member includes the plate member coupled to a first transverse plate and the plate member is pivotally coupled to the first transverse plate.

7. The camera adapter support according to claim 1, wherein the second upstanding member includes the plate member coupled to a first transverse plate.

8. The camera adapter support according to claim 7, wherein the first transverse plate is shaped and dimensioned for engaging the base member and supporting the second upstanding member as it sits upon the base member.

9. The camera adapter support according to claim 7, wherein the plate member is fixedly coupled to the first transverse plate.

10. The camera adapter support according to claim 9, wherein the plate member is oriented substantially perpendicular to the base member.

11. The camera adapter support according to claim 7, wherein the plate member is pivotally coupled to the first transverse plate.

12. A camera adapter support for supporting a camera in an orientation transverse to its traditional orientation, comprising:

a base member shaped and dimensioned for selective attachment to a head of a tripod, the base member including a first end and a second end;

a first upstanding member secured to the first end of the base member, the first upstanding member including a first end secured to the first end of the base member and a second end, the first upstanding member including coupling structure which secures a base of a camera to the first upstanding member;

a second upstanding member secured to the second end of the base member, the second upstanding member including a first end secured to the second end of the base member for selective movement relative thereto and a second end wherein the second upstanding member includes a plate member and a second transverse plate coupled to the plate member, the second transverse plate being shaped and dimensioned for supporting a portion of a camera as it lies across the base member;

wherein the coupling structure of the first upstanding member includes a plurality of apertures formed therein for receiving coupling members which secure a base of a camera to the first upstanding member.

13. The camera adapter support according to claim 1, wherein the second transverse plate may be selectively moved relative to the plate member.

14. A camera adapter support for supporting a camera in an orientation transverse to its traditional orientation, comprising:

a base member shaped and dimensioned for selective attachment to a head of a tripod, the base member including a first end and a second end;

a first upstanding member secured to the first end of the base member the first upstanding member including a first end secured to the first end of the base member and a second end, the first upstanding member including coupling structure which secures a base of a camera to the first upstanding member;

a second upstanding member secured to the second end of the base member, the second upstanding member including a first end secured to the second end of the base member for selective movement relative thereto and a second end, wherein the second upstanding member includes a plate member and a second transverse plate coupled to the plate member the second transverse plate being shaped and dimensioned for supporting a portion of a camera as it lies across the base member;

wherein the second transverse plate includes a locking screw selectively securing the second transverse plate to the plate member.

15. The camera adapter support according to claim 1, wherein the second upstanding member may be selectively moved relative to the base member.

16. The camera adapter support according to claim 15, wherein the second upstanding member may be longitudinally moved relative to the base member.

17. The camera adapter support according to claim 15, wherein the plate member of the second upstanding member may be pivotally moved relative to the base member.

18. The camera adapter support according to claim 1, wherein the base member includes a plurality of apertures for attachment of the camera adapter support to a head of a tripod.

* * * * *